E. PEDERQUIST.
FEED ROLLER MECHANISM.
APPLICATION FILED MAY 24, 1913.
1,096,857.
Patented May 19, 1914.
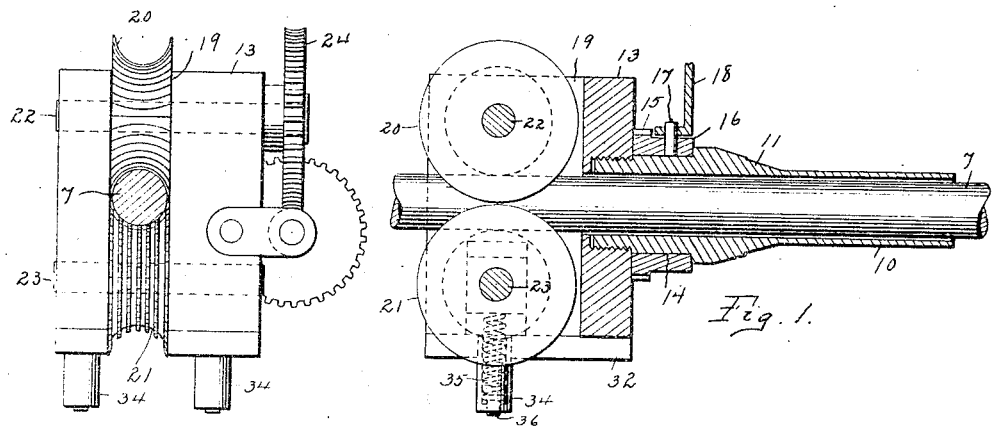
Fig. 2.    Fig. 1.
Fig. 6.
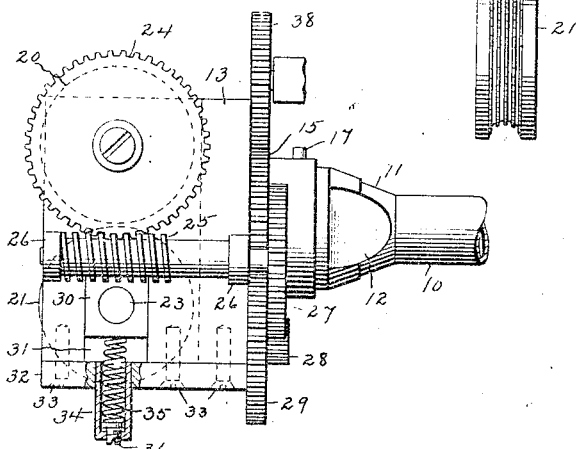
Fig. 3.
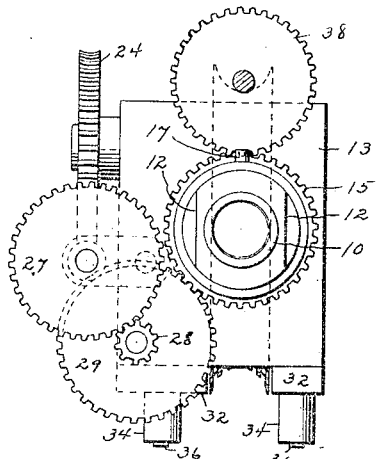
Fig. 4.
Fig. 5.
Witnesses:
F. L. Green
Angeline M. Cozzone
Ernest Pederquist Inventor
By Louis M. Sanders Attorney

UNITED STATES PATENT OFFICE.

ERNEST PEDERQUIST, OF NEWARK, NEW JERSEY, ASSIGNOR TO MEISSELBACH-CATUCCI MANUFACTURING COMPANY, A CORPORATION OF NEW JERSEY.

FEED-ROLLER MECHANISM.

1,096,857.     Specification of Letters Patent.     Patented May 19, 1914.

Original application filed November 26, 1912, Serial No. 733,588. Divided and this application filed May 24, 1913. Serial No. 769,557.

*To all whom it may concern:*

Be it known that I, ERNEST PEDERQUIST, a citizen of the United States, residing in the city of Newark, county of Essex, and State of New Jersey, have invented certain new and useful Improvements in Feed-Roller Mechanism, of which the following is a specification.

In the patent to Pliny Catucci, No. 978,113; dated December 6, 1910, is shown a hobbing gear cutter, which in practice has proven to be very successful in cutting gears and pinions and my invention is in the nature of an attachment to the machine of the patent, whereby I am enabled to produce pinion rods of any length, such length being limited only by the length of the blank rod upon which the teeth are to be cut.

The improvement therefore, has for its object the provision of means for continuously feeding a blank pinion rod to a hob cutter giving said rod not only a travel in the direction of its axis but also a rotary motion, so that the hobbing cutter may simultaneously and continuously cut all of the teeth in the rod.

In the accompanying drawings which illustrate my invention: Figure 1 is a sectional view substantially through the axis of the pinion rod. Fig. 2 is a front view of the feeding device. Fig. 3 is a side elevation of the same showing the gear plan. Fig. 4 is a rear view showing the driving gear plan. Fig. 5 illustrates a modified form of yielding bearing for one of the feed rollers. Fig. 6, illustrates a pair of rollers for smaller rods.

In the drawings and specification similar reference numerals are used to designate like parts throughout.

I will now proceed to describe my improved feeding device.

It consists of the hollow cylindrical shank 10, by which it is held in the chuck of a hob gear cutting machine, for example like that shown in Catucci's patent above mentioned. It has the conical part 11, for properly centering it in the chuck. This conical portion is also flattened at 12, for the purpose of affording a wrench or vise hold in order that the shank may be firmly screwed into the supporting block 13, as shown in Fig. 1. The shank 10 is further provided with a reduced cylindrical bearing 14, upon which the gear 15 is mounted. The gear 15 is provided with an elongated hub 16, into which is securely fixed the pin 17, over which the arm 18 extends, said arm being rigidly secured to some fixed part of the machine, as for example, the headstock. This arrangement permits the shank 10 to rotate freely within the gear 15 and its hub 16, while the latter is held from rotating by means of the rigid arm 18.

The supporting block 13 is generally rectangular in shape, and, as above indicated, is firmly screwed upon the end of the shank 10 as shown. It is provided with the slot 19, cut into its front face to receive the two feed rollers 20, 21, which are mounted upon the cross shafts 22 and 23, extending through the side walls of the block 13. Upon the end of the shaft 22, is mounted the worm-wheel 24, which engages the worm 25, the latter mounted in bearings 26—26, upon the side of the block 13. Upon the rear projecting end of the worm 25, is rigidly secured the gear 27, meshing with the pinion 28, which latter is secured to the gear 29 in position for engagement with the gear 15 upon the shank 10. The arrangement of the train of gears just described is such that the relative rotation of the gear 15, with respect to the shank 10 and the block 13, will produce a positive rotation of the feed roller 20; or what amounts to the same thing, when the shank 10 and block 13 are rotated, while the gear 15 is held against rotation by the arm 18, a positive rotation of the feed roller 20, and the consequent advance of the rod 7 take place.

The bearings 30 for the shaft 23, are located in open slots 31 in the block 13. The cross bars 32 are rigidly secured to the block 13 across said slots 31 by means of screws 33, and in said cross bars 32 are rigidly secured the spring barrels 34, within which are located the coil springs 35 which bear upon the bearings 30 so as to afford a strong but yielding pressure upon the shaft 23, and through said shaft upon the feed roller 21. The spring 35 may be adjusted by means of the small headed screws 36, which are threaded into the outer ends of the barrels 34, as will be readily understood. I find that I may dispense with the spring barrels in some cases and substitute therefor a block of wood 37, locating the same between the bearings 30, and the cross bars 32, as shown in Fig. 5. The blocks of wood are sufficiently yielding to afford the necessary pressure upon the shaft 23 to cause the feed roller 21 to bite into the rod 7. As shown in Fig. 2, the two feed rollers 20 and 21 are knurled, the roller 21 being knurled across its circumference so as to bite into the rod 7, and since the roller 20 is a live roller, it produces a longitudinal feed of the rod 7. The roller 21 is not only cross knurled but is circumferentially grooved as shown, so that there will be no tendency in the rod 7 to accidentally twist as it is fed against the hob-cutter of the machine upon which it may be used.

I regard the above described knurling of the two rollers 20 and 21 as important features of my improvement, inasmuch as the live roller 20 produces the longitudinal feeding of the rod while the circumferentially grooved roller 21 prevents the accidental twisting of the rod between the rollers, and yet permits the said rod to advance upon the cutter on the machine, with a sort of screw motion which is necessary to the proper cutting of the teeth in the rod.

By the mechanism above described, I am enabled to cut pinion rods of any length as it is only necessary to set the parts in position and start the cutting action. So long as power is applied to the machine, the cutting will take place until the end of the rod is reached.

As above described, pinion rods have become a staple article in the market and users of such rods cut them into various thicknesses for various uses in the mechanic arts; but hitherto, so far as I am aware, the lengths of such rods have been limited to from 6 inches to 1 foot, this of course being due to the capacities of the machines designed for the cutting of such rods.

While I have described the feed rollers for use in connection with pinion rod cutting, both in the present application and in the application from which this application has been divided, yet I do not desire to confine the use of the feed rollers to such work alone, for the reason that feed rollers thus mounted are capable of use in many other relations where it is desired to feed cylindrical rods accurately either directly without rotation upon the axis of such rods or to feed them with a combined forward and rotative movement. Many other uses of the feed rollers constructed, the one with cross knurling and the other with circumferential grooves will occur to those skilled in mechanic arts. I therefore do not desire to confine the feed rollers specifically to pinion rod cutting.

As a means for feeding the cylindrical rod 7, directly without rotation I may provide the following mechanism: Meshing directly with the gear wheel 15 is a gear 38, positively driven by some mechanism of the machine upon which my improvement is mounted. In this case the headstock of the machine in which the shank 10 is rigidly held stationary while the arm 18 is disconnected from the pin 17. In this case the rotation of the gear 38 will rotate the gear 15, and consequently entire train 29, 28, 27, worm 25 and worm-wheel 24, thereby carrying with it the live roller 20. Thus the device is readily adapted for use in feeding blank pinion rods either to a hob cutter in which case the rod 7 itself must be made to rotate, or by the use of the driving gear 38, the rod 7 may be fed directly and without rotation to a single milling cutter. In either case no change whatsoever is made in the structure of the device.

In Fig. 6 I have shown a pair of my improved feed rollers 20', 21', designed for smaller rods than the pair shown in the remaining figures. Thus by using the change rollers, various sized rods up to the capacity of the device may be fed through it. Relatively larger rods than the ones shown in Figs. 1 and 2 would of course require a larger device, but this is a matter of dimension only.

This application is a division of my prior application, Ser. No. 733,588, Filed November 26, 1912, for feed roller mechanism for pinion rod cutting.

I claim:

1. In a pinion rod feed mechanism the combination of a pair of peripherally grooved feed rollers, mounted upon parallel shafts, each of said rollers having its peripheral groove cross knurled and one of said rollers being further provided with a plurality of supplemental circumferential grooves.

2. In a pinion rod feeding mechanism, the combination of a pair of peripherally grooved feed rollers, mounted upon parallel axes, one of said rollers having its groove cross knurled, and the other roller having its groove provided with a plurality of supplemental circumferential grooves.

3. In a pinion rod feeding mechanism, a pair of circumferentially grooved feed rollers, each of said rollers having its groove cross knurled and one of said rollers being provided with a plurality of supplemental circumferential grooves, and means for positively rotating one of said rollers.

4. In a pinion rod feed mechanism the combination of a pair of peripherally grooved feed rollers, mounted upon parallel shafts, each of said rollers having its peripheral grooves cross knurled and one of said rollers being further provided with a plurality of supplemental circumferential grooves, fixed bearings for one of said rollers and yielding bearings for the other roller.

5. In a pinion rod feeding mechanism, the combination of a pair of peripherally grooved feed rollers, mounted upon parallel axes, one of said rollers having its groove cross knurled, and the other roller having its groove provided with a plurality of supplemental circumferential grooves, fixed bearings for one of said rollers and yielding bearings for the other roller.

6. In a cylindrical rod feeding mechanism, the combination of a rotating shaft, a roller rigidly secured to said shaft a circumferential groove in said roller, said groove having its face cross knurled, a second shaft, a roller rigidly secured to said second shaft, a circumferential groove in said second roller, said groove having its face cross knurled and provided with a plurality of supplemental circumferential grooves.

ERNEST PEDERQUIST.

Witnesses:
NORMAN E. ZUSI,
L. M. SANDERS.